Aug. 7, 1923.
E. G. DE LOE
1,463,876
SNUBBER
Filed Sept. 12, 1921
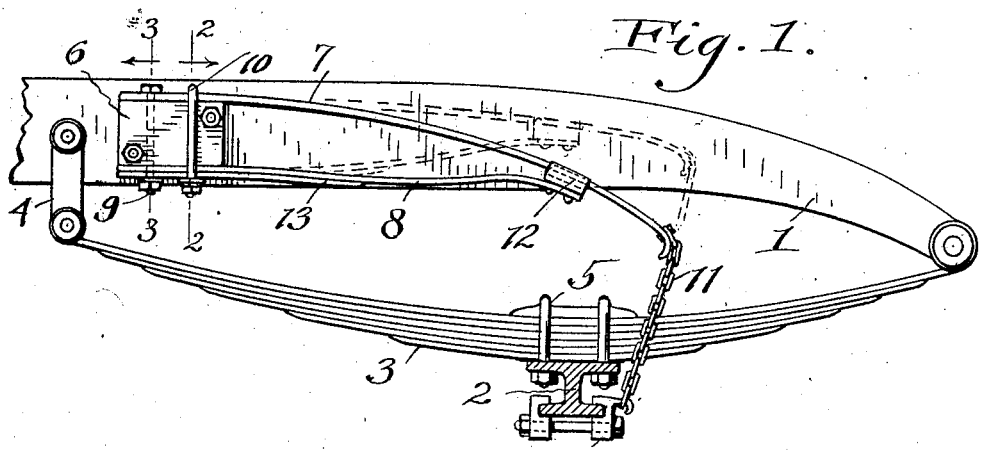
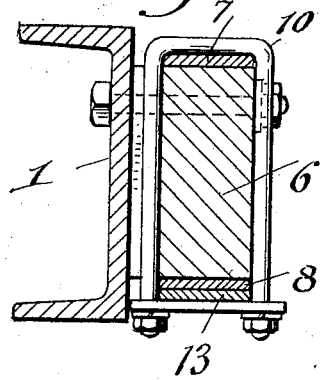 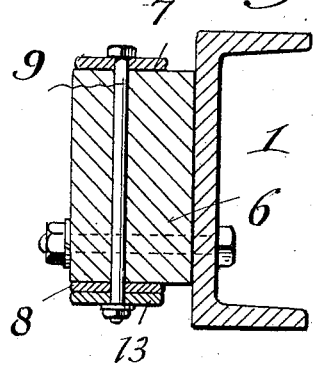
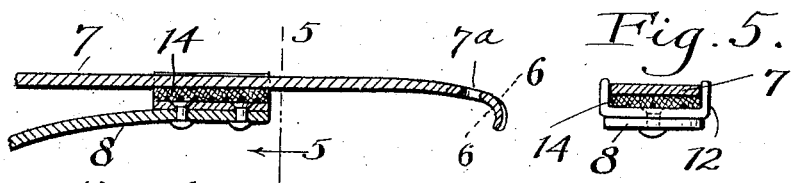
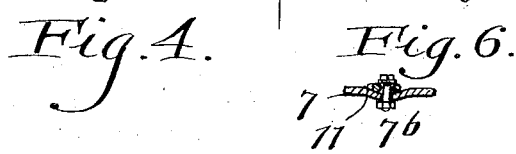 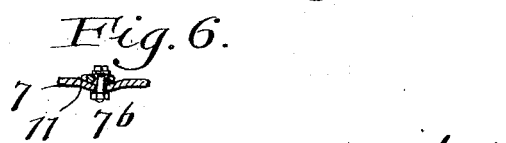
Inventor
Edward G. De Loe.
by Thurston Kwis & Hudson
attys.

Patented Aug. 7, 1923.

1,463,876

UNITED STATES PATENT OFFICE.

EDWARD G. DE LOE, OF CLEVELAND, OHIO, ASSIGNOR, BY DIRECT AND MESNE ASSIGNMENTS, OF ONE-HALF TO GEORGE W. LONGBRAKE, ONE-SIXTH TO ORVILLE L. LONGBRAKE, AND ONE-THIRD TO FREET A. DAYMON, ALL OF CLEVELAND, OHIO.

SNUBBER.

Application filed September 12, 1921. Serial No. 499,995.

*To all whom it may concern:*

Be it known that I, EDWARD G. DE LOE, a citizen of the United States, residing at Cleveland, in the county of Cuyahoga and State of Ohio, have invented a certain new and useful Improvement in Snubbers, of which the following is a full, clear, and exact description.

The present invention relates to a device which is adapted for attachment to a vehicle, particularly a motor driven vehicle which will act in a resilient manner to take up the rebound of the frame or body of the vehicle after the springs have been flexed incident to the wheel of the vehicle passing over an obstacle or hole in the road.

Reference should be had to the accompanying drawings forming a part of this specification, in which Fig. 1 is a side elevation with portions in section showing an embodiment of my invention; Fig. 2 is a section on the line 2—2 of Fig. 1; Fig. 3 is a section on the line 3—3 of Fig. 1; Fig. 4 is a vertical section of a part of the device; Fig. 5 is a section on line 5—5 of Fig. 4; Fig. 6 is a section on line 6—6 of Fig. 4.

At 1 there is indicated an end portion of a side member of a frame such as commonly used in motor driven vehicles and so far as the present invention is concerned is indicative of either the vehicle frame or body of the vehicle, which is usually secured to the frame.

An axle is indicated at 2 and will serve to indicate any axle construction with which wheels are associated as in common practice.

A semi-elliptical spring is indicated at 3 which at one end is directly connected to the frame by a shackle bolt, and at its opposite end is connected to the frame by a shackle link construction indicated at 4. All of the above is usual construction and for the purposes of this invention is given merely as indicative of any spring and spring connection for a vehicle.

The spring at the central portion is secured to the axle by clips 5 which are of usual construction.

Secured in any suitable manner to the side of the frame, is a support 6 and this support provides a top surface against which is secured one end of a leaf spring 7. The support also provides an oppositely disposed lower surface against which is secured one end of a second leaf spring 8.

The method of securing the ends of the leaf springs 7 and 8 is optional, but for the purpose there is shown a bolt 9 which extends through the leaves and support and additionally a yoke or U-bolt as indicated at 10.

The upper leaf spring 7 extends toward and above the axle 2 and at the forward or free end thereof there is secured one end of a cable 11. For the purpose of securing the cable, the leaf 7 is provided with a hole or holes 7ª through which the cable is put and tied and additionally for the purpose of retaining and guiding the cable, the end of the leaf 7 is curved and formed with a groove 7ᵇ in which groove the cable lies.

The end of the cable 11 is secured to the axle 2 by any suitable means such as the bracket 11ª.

The leaf 8 extends toward the axle but is not so long as the leaf 7 and moreover it is curved toward the leaf 7 and at the end of the leaf 8 there is a friction device generally indicated at 12 which engages the leaf 7 with a sliding contact.

The leaf 8 exerts an upward pressure upon the leaf 7 so that the constant tendency of the leaf 8 is to move the leaf 7 upward into the dotted line position shown in Fig. 1.

To assist the leaf 8 to exert and maintain this pressure, a short auxiliary leaf 13 may be used which at one of its ends is secured to the support 6 and extends away from the support in contact with the leaf 8 for a short distance.

The friction device 12 comprises a box-like structure which is open at its top and ends. Secured to the bottom of the box-like structure is a strip of friction material 14 of any suitable kind.

The leaf rests upon the surface of the friction material 14 and rubs against the friction material when the device is in operation, as will later be described.

When the device is assembled upon a vehicle and the support 6 is secured in place, the leaf 8 exerts an upward pressure against leaf 7 which flexes this leaf to a certain extent, and the two springs equalize with the leaves 7 and 8 in approximately the relative position shown in dotted lines in Fig. 1.

In securing the free end of leaf 7, the leaf is flexed to such an extent that when under flexure of the spring the frame and axle move toward each other the maximum permissible amount, the leaf 7 will still be under a slight tension, so that no matter how quickly the spring 3 may move, it will not slacken the cable 11 and thereby produce a whipping action.

Assuming that the device is assembled as shown in Fig. 1, then when the spring 3 is flexed so that the axle and frame relatively approach each other, the leaves 7 and 8 will readily move toward the position shown in dotted lines in Fig. 1 and the friction device will slide along leaf 7, but inasmuch as the tension on the cable 11 is relieved by the relative movement of axle and frame, there will be little frictional effect manifest.

When, however, the return action of the spring 3 becomes effective, then tension is brought on cable 11 and leaf 7 is flexed downward against the upward thrust of leaf 8 exerted through the friction device 12 and the frictional effect increases in intensity as leaf 7 is pulled down, thus providing an increasing braking effect on the downward movement of leaf 7.

Various modifications in the structure shown may be made without departing from the spirit of the invention.

Having described my invention, I claim—

1. The combination with a frame member and an axle member, of a pair of spring leaves which at one of their ends are spaced apart and secured upon one of said members, one of the leaf springs having a frictional engagement with the other leaf spring and said other leaf spring at the free end thereof being secured to the other of said members.

2. The combination with a frame member and an axle member, of a pair of spring leaves which at one of their ends are spaced one above the other and secured upon one of said members, one of the leaf springs having a frictional engagement with the other leaf spring and said other leaf spring at the free end thereof being secured to the other of said members in such a manner that both of the leaf springs are under tension.

3. The combination with a frame member and an axle member of a pair of leaf springs arranged one above the other the said leaves at one of their ends being spaced and secured upon one of said members, one of said leaves at its free end being secured to the other of said members, and the other leaf spring at its free end having frictional engagement with the first mentioned leaf spring whereby when the axle member and frame member move away from each other there is increasing friction to oppose such movement.

4. The combination with a frame member and an axle member, of a pair of leaf springs arranged one above the other which at one of their ends are spaced and secured upon one of said members, one of said leaf springs being longer than the other and at its free end being connected with the other of said members, the shorter leaf spring having a frictional engagement with the longer leaf spring.

5. The combination with a frame member and an axle member, of a pair of leaf springs arranged one above the other in spaced relation, said leaves at one of their ends being secured upon one of said members, one of the leaf springs being longer than the other and at its free end connected with the other of said members, the shorter leaf spring having a frictional device secured thereto adjacent the free end thereof which frictional device is in engagement with the longer spring.

6. The combination with a frame member and an axle member, of a pair of leaf springs arranged one above the other, said leaves at one of their ends being secured upon one of said members, one of the leaf springs being longer than the other and at its free end connected with the other of said members, the shorter leaf spring at its free end engaging with the longer leaf spring, said shorter leaf spring being under tension which works against the longer leaf spring whereby when the longer leaf spring moves against the shorter leaf spring there is an increasing frictional engagement.

7. The combination with a frame member and an axle member, of a pair of leaf springs arranged one above the other, said leaves at one of their ends being secured upon one of said members, one of the leaf springs being longer than the other and at its free end connected with the other of said members, a frictional device carried by the shorter leaf spring adjacent the end thereof and contacting with the longer leaf spring, said shorter leaf spring being under tension which forces the frictional device into contact with the longer leaf spring, said longer leaf spring when the free end is moved against the frictional device having a constantly increasing frictional engagement with the friction device.

8. A device of the character described comprising a support, a pair of spaced leaf springs which at one of their ends are each secured to said support, one of said leaf springs being longer than the other, a friction device mounted upon the shorter spring adjacent the end thereof which friction device engages with the longer spring, and an attaching means carried adjacent the free end of the longer spring.

9. In a device of the character described, the combination with a support, a pair of leaf springs which at one of their ends are secured to said support, one of the leaf springs being longer than the other, a friction device carried by the shorter leaf spring adjacent the end thereof, said shorter leaf spring being under tension which forces the friction device into contact with the longer leaf spring, and an attaching means carried by the longer leaf spring adjacent the free end thereof.

In testimony whereof, I hereunto affix my signature.

EDWARD G. DE LOE.